United States Patent [19]

Ray

[11] 4,423,905
[45] Jan. 3, 1984

[54] LATCH MECHANISM

[75] Inventor: George A. Ray, Crewe, England

[73] Assignee: Rolls-Royce Motors Limited, Crewe, England

[21] Appl. No.: 235,159

[22] Filed: Feb. 12, 1981

[30] Foreign Application Priority Data

Feb. 16, 1980 [GB] United Kingdom ................ 8005297

[51] Int. Cl.³ .............................................. A47C 7/38
[52] U.S. Cl. .................................... 297/391; 297/216; 403/11
[58] Field of Search ............... 297/391, 410, 353, 216, 297/379; 403/11

[56] References Cited

U.S. PATENT DOCUMENTS

| 3,366,179 | 1/1968 | Kinley et al. | 403/11 X |
| 3,397,911 | 8/1968 | Brosins, Sr. | 297/410 X |
| 3,405,971 | 10/1968 | Kobrehel | 297/216 |
| 3,512,832 | 5/1970 | Kage | 297/410 |
| 3,572,834 | 3/1971 | Herzer | 297/410 |
| 3,904,241 | 9/1975 | Makinen | 297/391 |

FOREIGN PATENT DOCUMENTS

| 1161602 | 8/1969 | United Kingdom . | |
| 1175726 | 12/1969 | United Kingdom . | |
| 1219234 | 1/1971 | United Kingdom . | |
| 1336341 | 11/1973 | United Kingdom | 297/216 |
| 1485036 | 9/1977 | United Kingdom . | |

Primary Examiner—William E. Lyddane
Attorney, Agent, or Firm—Cushman, Darby & Cushman

[57] ABSTRACT

A latch mechanism for the head restraint of a vehicle seat comprises latches 22 pivotally connected to the bases of projections 5 and 6 of a frame forming a part of the restraint. These projections 5 and 6 fit into complementary tubes 7 and 8 in the top of the corresponding seat. Respective balls 26 normally maintain the latches 22 in an inoperative position so that the projections 5 and 6 can be withdrawn from the tubes. In the event of a collision tending to force the restraint upwards away from the seat the balls are thrown upwards releasing the latches and allowing them to swing outwards so that they hook the bottoms of the tubes 7 and 8 as the restraint moves upwards to prevent further upward movement. Each latch may be double hooked if desired.

12 Claims, 6 Drawing Figures

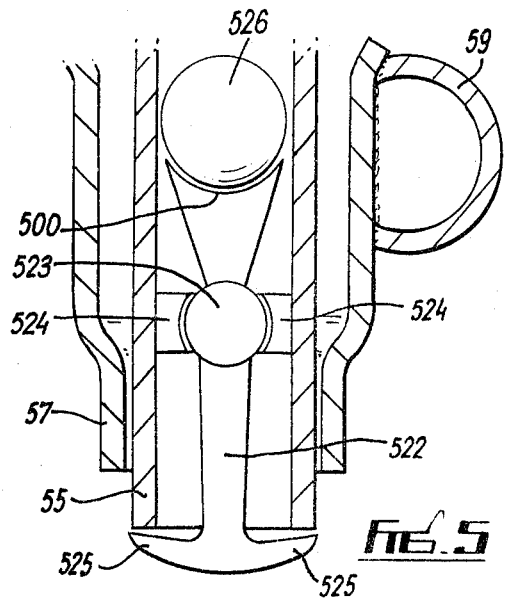
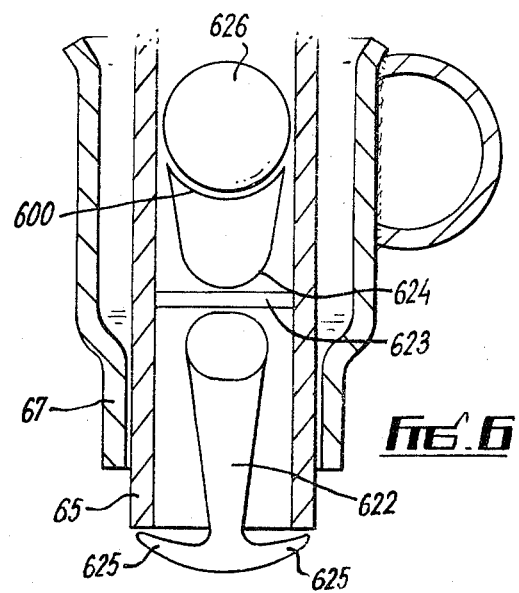

LATCH MECHANISM

The present invention relates to a latch mechanism. The mechanism is intended particularly, but not exclusively, for retaining a head restraint in the corresponding seat squab portion of a vehicle seat under certain impact conditions to which the vehicle may be subjected.

As is known, head restraints of this nature are intended to prevent backward movement of the head and whiplash injuries which result from this when the associated vehicle is involved in a collision. In certain types of head restraint, in order to facilitate removal of the restraint, the frame of the restraint is made a sliding fit in complementary tubular recesses formed in the squab portion of the corresponding seat. It has been found that under certain, rear, impacts to which the vehicle may be subjected, the restraint is subject to a force tending to separate it from the corresponding squab portion of the seat. Not only does this reduce or eliminate its effectiveness as a head restraint, it also constitutes an additional hazard as a projectile within the passenger compartment. The present invention is intended to overcome this problem whilst still retaining easy removability of the restraint under normal operating conditions.

According to the present invention, there is provided a latch mechanism for connecting two members together comprising a latch pivotally mounted on one of the members for movement between a first position, in which the two members can be moved relative to one another in a given direction, and a second position in which relative movement between the two members in the given direction is restrained and means for holding the latch in the first position, said means being movable to allow movement of the latch to the second position when said members are simulataneously subjected to an external force resulting in a component of force tending to separate them.

In a preferred embodiment of the invention, one or more of the following features may advantageously be included.

(a) The two members are the head restraint and squab portion of a vehicle seat.

(b) The head restraint of (a) comprises a frame member having at least one elongate projection which fits into a corresponding tubular aperture in the squab portion of (a).

(c) The latch comprises a hook at its end remote from the pivot which is operative to connect with the squab portion in the said second position.

(d) The holding means for the latch comprises a ball or spring.

(e) The elongate projection of the head restraint is hollow and houses the pivotally mounted latch and the ball of (d) is lodged between the latch and the internal wall of the elongate projection in the said first position and is forced out from between this wall and the latch in the said second position to allow the latch to pivot.

(f) The tubular aperture of (b) is defined by a tube and the hook of the latch engages around the lower end of this tube in the said second position of the latch.

(g) One of the members is a head restraint and the other member is the squab portion of a vehicle seat and the restraint comprises two elongate projections which are a sliding fit in respective tubular apertures formed in the squab portion, each elongate projection being hollow and having a latch pivotally mounted therein with a ball forming the means for holding and adapted to be lodged between the latch and the internal wall of the tube defining the tubular aperture in the said first position and being forced out of this lodged position to allow pivotal movement of the latch into the second position.

(h) The two latches of (g) are hooked and the hooks face in opposite directions.

The invention also comprises a vehicle seat incorporating the latch mechanism as defined above and a vehicle incorporating such a vehicle seat.

In order that the invention may be more clearly understood, one embodiment thereof will now be described, by way of example, with reference to the accompanying drawings, in which:

FIG. 5 shows a section of an alternative detail to the detail shown in FIGS. 3 and 4, and FIG. 6 shows a further alternative detail to the detail shown in FIGS. 3 and 4.

Figure 1:
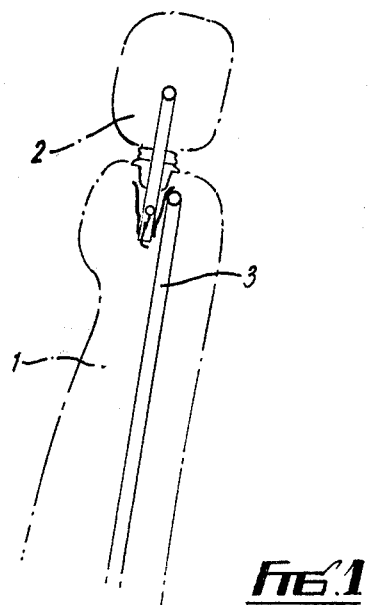
FIG. 1 shows a partial side elevational view in section of an automobile seat.
Figure 2:
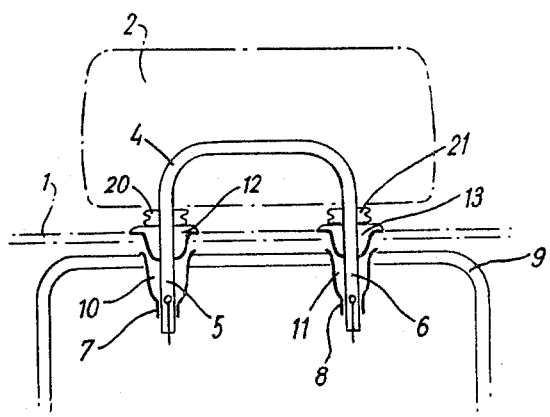
FIG. 2 shows a front elevational view in section of the seat of FIG. 1.
Figure 3:
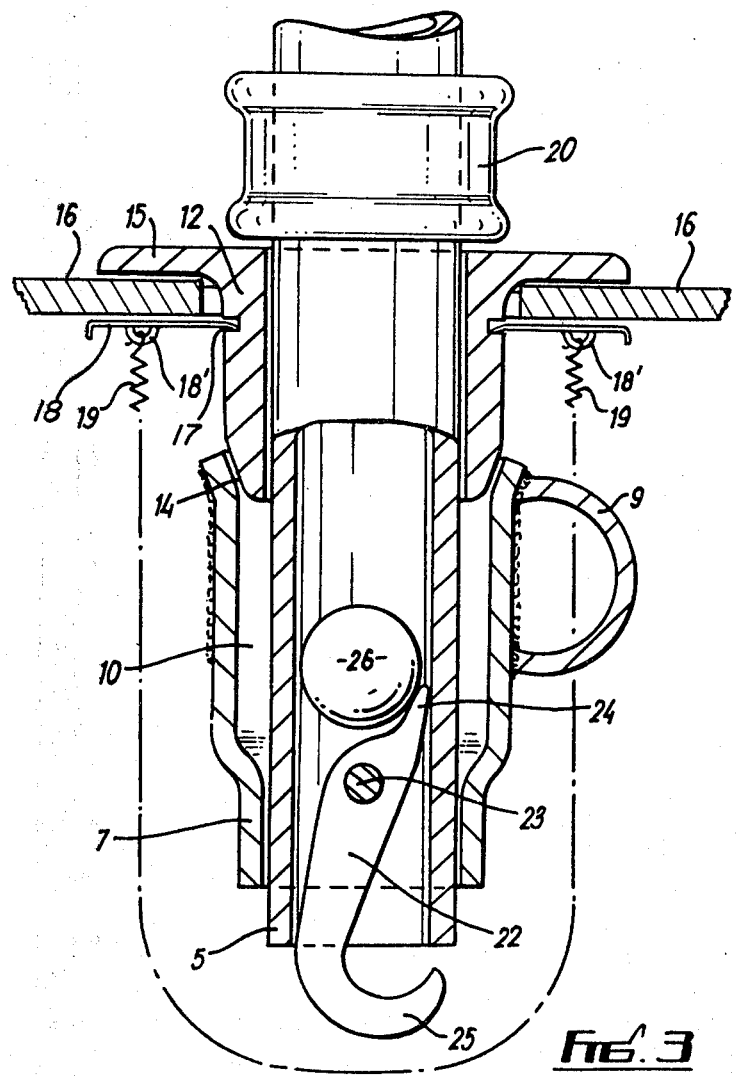
FIG. 3 shows a section of a detail of part of the seat of FIGS. 1 and 2.
Figure 4:
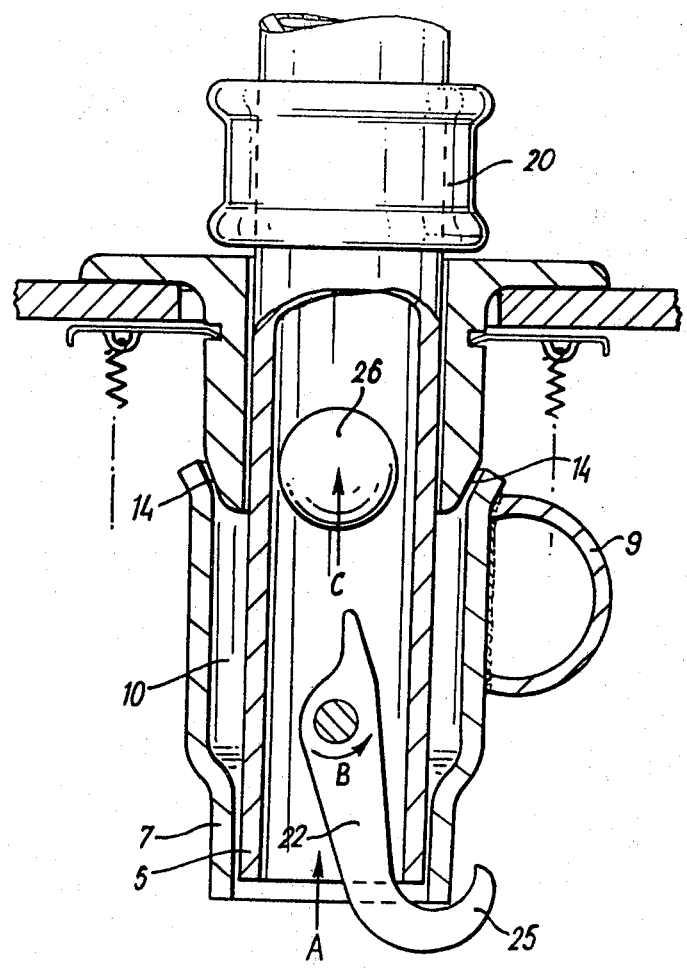
FIG. 4 shows the same detail of the seat as FIG. 3 but in a different operative position.

Referring to the drawings, the squab portion of an automobile seat with an attached head restraint is shown. The squab portion and head restraint, the upholstered parts of which are shown in dash dotted outline, are referenced 1 and 2 respectively. The squab portion 1 comprises a frame 3 of tubular steel. The head restraint 2 comprises an inverted U-shaped tubular steel frame 4. The downwardly depending arms of the U-shaped frame 4 form elongate projections 5 and 6. These elongate projections are a sliding fit in respective tubes 7 and 8 fitted into the squab portion and welded to the upper cross member 9 of the frame 3 of the squab portion. The upper end of each tube 7, 8 is flared so that annular gaps 10 and 11 are defined between the upper ends of the tubes 7 and 8 and their corresponding projections 5 and 6. The gap 10 can be more clearly seen in the detailed views of FIGS. 3 and 4 which illustrate the fitting of the elongate projection 5 in the tube 7.

Two escutcheons 12 and 13 coaxially surround respective elongate projections 5 and 6 and are inserted into respective gaps 10 and 11 to locate respective projections 5 and 6 in their corresponding tubes 7 and 8. As can be seen from FIGS. 3 and 4 the lower end of each escutcheon is chamfered at 14 to facilitate entry of the escutcheon into the corresponding gap 10. 11 and to provide a wedging effect of the escutcheon in the corresponding tube 7, 8. Each escutcheon comprises a flange 15 which sits on top of the upper surface of the upholstery. This may comprise, for example, a layer of leather 16. Each escutcheon also defines an annular recess 17. This recess 17 receives a spring retaining washer 18, the leather upper layer of the upholstery being slightly compressed between the lower surface of the flange 15 and the upper surface of the washer 18. This washer 18 is also formed with loops 18 on its undersurface to which a U-shaped spring 19 is connected to hold the upholstery in position relative to that part of the headrest assembly in the squab. Respective distance pieces 20 and 21 coaxially surround elongate projections 5 and 6 to space the lower surface of the upholstered part of the headrest 2 from the upper surfaces of the escutcheons 12 and 13.

Referring again particularly to FIGS. 3 and 4, each elongate projection 5, 6 houses a latch 22 which is pivotally mounted therein by means of a pivot 23. the upper end of the latch is formed with finger 24 and the lower end of the latch is formed with a hook 25. The shape of the finger 24 is such that a cavity is effectively defined between the latch 22 and the interior wall of the corresponding elongate projection 5. This cavity houses a steel ball 26. The weight of this ball is such that in the normal rest position of the mechanism the latch 22 is pivoted clockwise until the finger 24 abuts the interior wall of the projection 5 thus withdrawing the hook 25 of the latch 22 into the downwardly projected area of the projection. Thus, there is no impediment to the withdrawal of the headrest 2 from the squab portion 3 and this withdrawal can be achieved by a vehicle driver without any additional unlocking action being necessary. With the majority of automobiles, it will be possible to pivot the squab portion 1 of the seat relative to the seat portion so that the projections 5 and 6 are oriented at an angle to the vertical. The latch 22 and ball 26 are however so chosen that at the maximum pivoted angle of the squab portion 1, the ball will still pivot the latch fully clockwise and withdraw the hooked portion 25 of the latch 22 into an inoperative position.

If the automobile is subject to a rear impact, the headrest 2 is subject to a force tending to lift it out of the squab portion 1. The ball 26 is subject to a similar force and as it is not restrained it does in fact move up the tube of the corresponding projection thus allowing the latch 22 to pivot anticlockwise under its own weight. With this pivotal movement the hook 25 of the latch 22 extends out of the downwardly projected area of the corresponding elongate projection and as the projection moves up out of the corresponding tube (7 in FIG. 4) the hook engages under the base of this tube and prevents further relative movement of the projection relative to the tube. After the impact, the ball 26 simply falls back under gravity and once again pivots the latch 22 into its fully clockwise position thus releasing the projection 5 from the corresponding tube 7. The three arrows A, B and C are respectively to indicate the upward movement of the elongate projection 6, the anticlockwise movement of the latch 22 and the upward movement of the ball 26 under rear impact conditions of the automobile.

It will be appreciated that the above described embodiment has been described by way of example only and that many variations are possible without departing from the scope of the invention. In the above embodiment, each of the elongate projections 5, 6 is provided with its own latch 22. Although this is clearly a safer arrangement than an arrangement in which only one latch is provided, one latch arrangement may be used. For example, where the head restraint is supported on only one elongate projection, only one latch would generally be used. Where two latches are used, are unusual impact conditions can be catered for by having the hooks of the latches facing in opposite directions.

A further possible arrangement is to have a double hooked latch with the hooks extending in opposite directions so as to cater for impacts on the automobile having horizontal components in any direction. Such an arrangement is shown in FIG. 5. As can be seen from this Figure, the latch 522 is formed with two oppositely extending hooks 525. This latch 522 is provided with a spherical bearing 523 which seats in complementary part spherical bearings 524 extending from the sides of the tubular projection 55. The upper part of the latch 522 is formed with a concave support surface 500 in which the ball 526 is supported. An alternative to the arrangement of FIG. 5 is shown in FIG. 6 where the latch, which here is referenced 622, has a similar double hooked form to the latch 522 of FIG. 5, but is differently pivotally mounted. The pivotal mounting here consists of a bar 623 extending across the tubular projection 65 and through a chamfered aperture 624 formed in the latch 622 itself. This portion of the latch is shown in section in order to illustrate the formation of the aperture. In both the arrangements of FIGS. 5 and 6, apart from the details already described above, the latch is similar to the latch illustrated in FIG. 3. Features of all three latching arrangements which correspond have been given the same reference numerals prefixed by 5 in FIG. 5 and by 6 in FIG. 6.

With all of the described embodiments, the frictional forces tending to retain the headrest in the squab are greater than the restraint on the ball. Under impact conditions, therefore, the ball moves first to free the latch so that is can move to an operative position before the headrest can leave the squab portion of the seat.

What is claimed is:

1. A latch mechanism for connecting two members together, said latch mechanism comprising:

a latch pivotally mounted on one of said two members for movement between a first position in which said two members can be moved relative to one another in a given direction, and a second position in which relative movement between said two members is restrained; and holding means free of and movable relative to said two members and said latch, said holding means being subjected by gravity to engage and hold said latch in said first position, and said holding means being free to move away from engagement with said latch to allow pivotal movement of said latch to said second position when said two members are simultaneously subjected to an involuntary external force resulting in a component of force tending to separate said two members.

2. A latch mechanism as claimed in claim 1, in which the two members are the head restraint and squab portion of a vehicle seat.

3. A latch mechanism as claimed in claim 2, in which the head restraint comprises a frame member having at least one elongate projection which fits into a corresponding tubular aperture in the squab portion.

4. A latch mechanism as claimed in claim 3, in which the holding means for the latch comprises a ball and the elongate projection of the head restraint is hollow and houses the pivotally mounted latch, said ball being lodged by gravity between the latch and an internal wall of the elongate projection in the said first position and is forced out from between said wall and the latch in the said second position to allow the latch to pivot.

5. A latch mechanism as claimed in claim 4, in which the tubular aperture is defined by a tube and said latch includes a hook at an end remote from the pivot, said hook of the latch engaging around the lower end of said tube in the said second position of the latch.

6. A latch mechanism as claimed in claim 2, in which the latch comprises a hook at its end remote from the pivot which is operative to connect with the squab portion in the said second position.

7. A latch mechanism as claimed in claim 6, in which said squab portion has a tubular aperture for receiving the one of said two members, the tubular aperture being defined by a tube and the hook of the latch engages around the lower end of said tube in the said second position of the latch.

8. A latch mechanism as claimed in claim 1, in which the holding means for the latch comprises a ball.

9. A latch mechanism as claimed in claim 1, in which one of said two members is a head restraint and the other member is a squab portion of a vehicle seat and the restraint comprises two elongate projections which are a sliding fit in respective tubular apertures formed in the squab portion, each elongate projection being hollow and having a latch pivotally mounted therein with a ball forming the means for holding and adapted to be lodged between the latch and the internal wall of the tube defining the tubular aperture in the said first position and being forced out of this lodged position to allow pivotal movement of the latch into the second position.

10. A latch mechanism as claimed in claim 1, in which the latch is hooked.

11. A latch mechanism as claimed in claim 1, in which the latch has two hooks facing in opposite directions.

12. A vehicle seat comprising:

a squab portion having a tubular aperture therein;

a head restraint, said head restraint including a frame member having at least one elongated tubular projection for fitting into said tubular aperture in said squab portion;

a latch mechanism for connecting said head restraint to said squab portion, said latch mechanism including a latch pivotally mounted in said elongated tubular projection of said frame member for movement between a first position in which said head restraint and said squab portion can be moved relative to one another in a given direction, and a second position in which relative movement between said head restraint and said squab portion in said given direction is restrained; and a ball positioned within and freely movable relative to said elongated tubular projection, said ball being subjected by gravity to engage between said latch and an internal wall of said elongated tubular projection for normally holding said latch in said first position, said ball being moved out from between said wall and engagement with said latch to allow said latch to pivot to said second position when said restraint and said squab portion are simultaneously subjected to an involuntary external force resulting in a component of force tending to separate said head restraint and said squab portion.

* * * * *